UNITED STATES PATENT OFFICE.

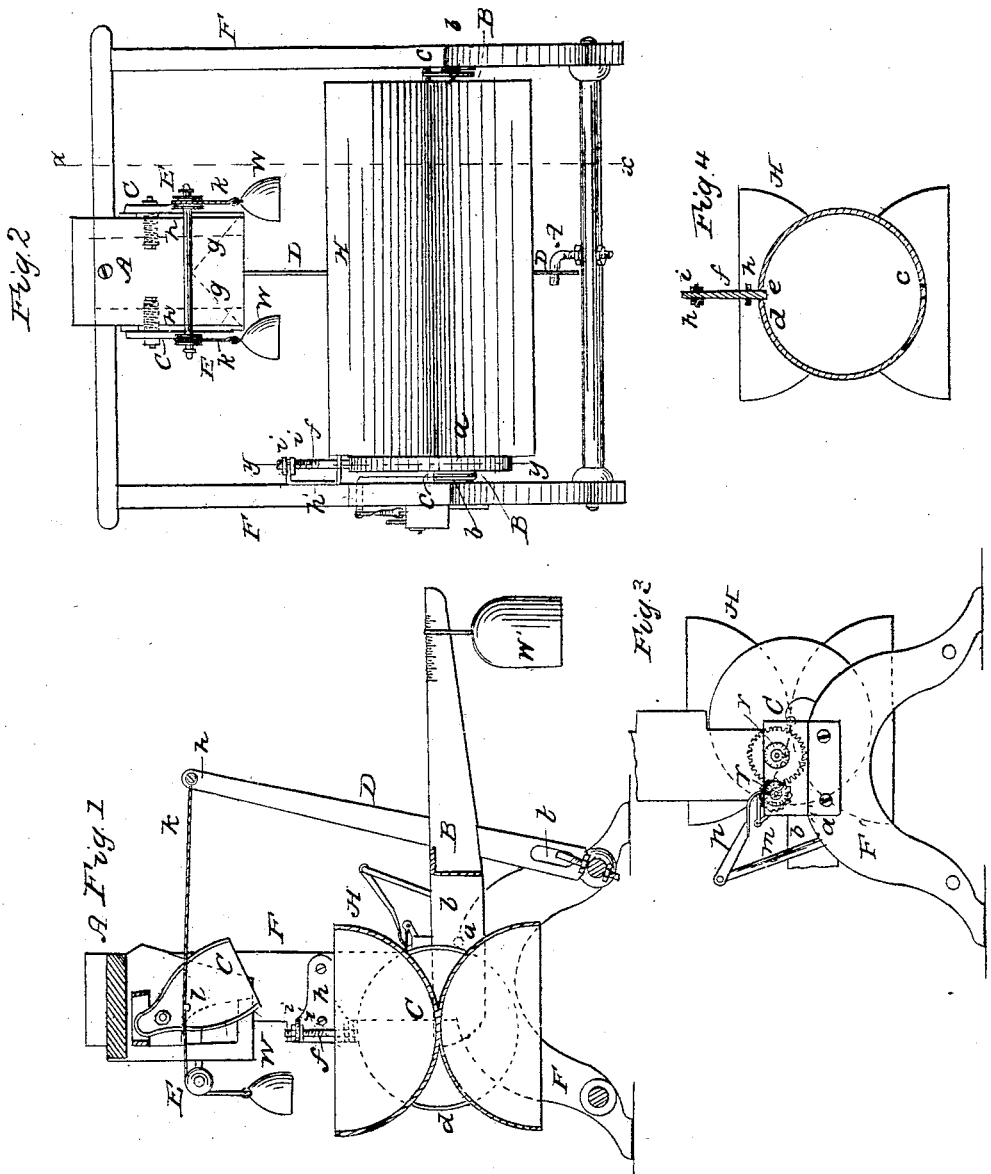

JOHN WILLIAMS, OF KALAMAZOO, MICHIGAN.

MACHINE FOR WEIGHING GRAIN.

Specification of Letters Patent No. 27,851, dated April 10, 1860.

*To all whom it may concern:*

Be it known that I, JOHN WILLIAMS, of Kalamazoo, in the county of Kalamazoo and State of Michigan, have invented a new and useful Improvement in Machines for Weighing Grain; and I do hereby declare that the following is a full, clear, and exact description of the same, reference being had to the annexed drawing, forming part of this specification, in the several figures of which similar characters of reference denote the same parts.

Figure 1 is a cross section of machine taken on $x$ $x$ of Fig. 2. Fig. 2 is a front elevation of machine. Fig. 3 is a view of dials and parts connected therewith. Fig. 4 is a section on $y$ $y$, showing adjustable stop.

In the drawing F is the frame in which is hung the double branched beam B in bearings $a$.

Between the arms $b$ $b$ is the hopper H; said hopper hung on journals $c$ $c$, so as to be capable of revolving as hereinafter to be set forth.

On one end of the hopper is a rim $d$, with openings $e$ at suitable distance apart for receiving the stop $f$. This is held in a small frame $h$ secured to the main frame and by means of nuts $i$ has a vertical adjustment for purposes to be described.

A is the feeding chute with double inclines $g$ $g$ for the passage of the grain to the hopper. The flow is regulated by the valves C C regulated as hereinafter to be described.

Running across the beam B is a bar D, at whose upper extremity are arms $h$ $h$, from which run cords $k$ over pulleys E, and bearing weights $w$ at their extremities, said cords being attached to the swinging valves C as seen at $l$, so that when permitted the weights draw the valves over the mouths of the chute. These valves by means of the screw on which they are hung are regulated so as to cut off different kinds of grain. They are also, so regulated by the attachment of the cords $k$ as that one will act sooner than the other and thus gradually check the flow of grain.

The lower extremity of bar D is slotted, and has within the slot an adjustable stop $t$ for preventing the too great descent of the hopper.

The extreme portion of the beam carries a weight, movable thereon, the beam being graduated for taking exact weights and for other purposes to be set forth. The arm $m$ on one of the branches $b$ of the beam carries a pawl $p$ which actuates the marking indices $r$ $r$ in the usual manner.

In operation the grain passes through the chute until the hopper receives the necessary quantity to depress it sufficient to drop rim $d$ below the stop $f$. This permits the hopper to revolve 180°, discharge its contents, and be again stopped by the stop $f$ entering the opposite opening $d$. Simultaneously with this movement the head of bar D approaches the chute, permitting weights $w$ to act and cut off the flow of grain. The entrance of stop $f$ into the second opening $d$, permits the bar D to fall back and reopen the chute. In this manner the weighing of the grain progresses automatically, each filling of the hopper producing the cutting off of the supply, discharge of the contents and registering of the draft.

It will here be noticed that this machine is so constructed as to allow for the excess which takes place in a number of successive drafts, above the required quantity measured at a single draft. By regulating the stop $f$ vertically a smaller vertical movement of the hopper is required for effecting the above named operations; thus diminishing the quantity of grain necessary to be received into the hopper to effect the purpose.

The adjustment of stop $f$ also requires the adjustment of stop $t$ vertically to allow for the small descent of hopper, and the adjustment of attachment of cords $k$ with the head of bar D. This is done by set screws at the ends of arms $h$, to which the cords will be attached. Another method of obviating this irregularity is given by the movement of weight W' on beam B, which being properly graduated, enables the operator to set the weight so that each draft shall be such as to give an aggregate that will be as near as possible to the desired weight measured at a single draft.

The valves C C being arranged so that one will close its opening before the other, gives a gradual flow of grain at the termination of the draft. And as they close from rear to front, the last portion of grain received is thrown on the front edge of the hopper and gives the tendency to rotation when the stop $f$ releases the rim $d$. This manner of cutting off the grain has the advantage of permitting the discharge of the filled hopper in due time, even though an obstruction should prevent the perfect closing of the valve, which is of great importance. In this it differs materially from other construc-
tions, the cutting off being here dependent on the movement of the hopper without being able if deranged to stop the proper function of the weighing portion of the machine.

The graduated scale arm B and movable weight W' enable the operator moreover to weigh any quantity that may be contained in the hopper less than the operating draft.

Having described my invention and the operation thereof—I disclaim of itself the revolving hopper such not being new.

What I do claim and desire to secure by Letters Patent is—

1. The revolving hopper H in combination with the bar D connected with beam, weights W at the extremities of cords $k$, and the attachment of said cords to the valves substantially as specified; so as to regulate the cutting off of grain by the weighing operation without making the proper action of the hopper dependent on the successful operation of the cut off.

2. The adjustable stop $f$ in combination with the openings $e$ in rim $d$, bar D, adjustable stop $t$, scale beam and weight; arranged and operating substantially as and for the purpose set forth.

In testimony whereof I have hereunto signed my name before two subscribing witnesses.

JOHN WILLIAMS.

Witnesses:
 GEO. PATTEN,
 JOHNS HOLLINGSHEAD.